Aug. 27, 1957 — I. L. BAYERKOHLER — 2,804,118
PNEUMATIC BELLOWS TYPE JACKS
Filed Sept. 13, 1954 — 2 Sheets-Sheet 1
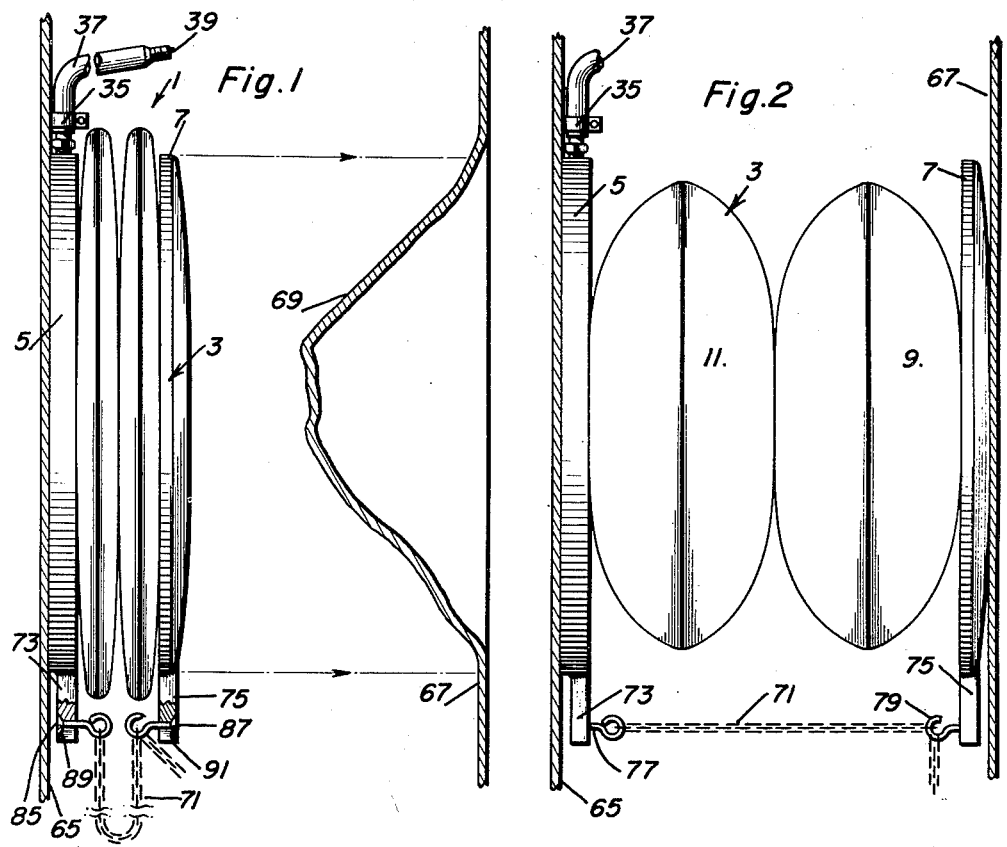
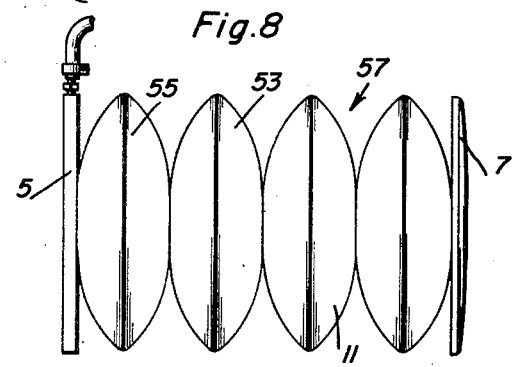
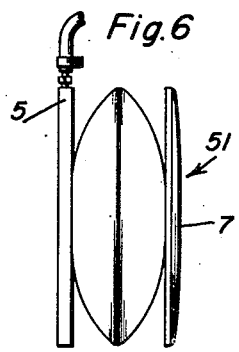
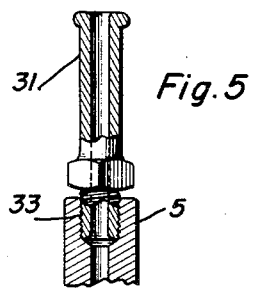
Irvin L. Bayerkohler
INVENTOR.

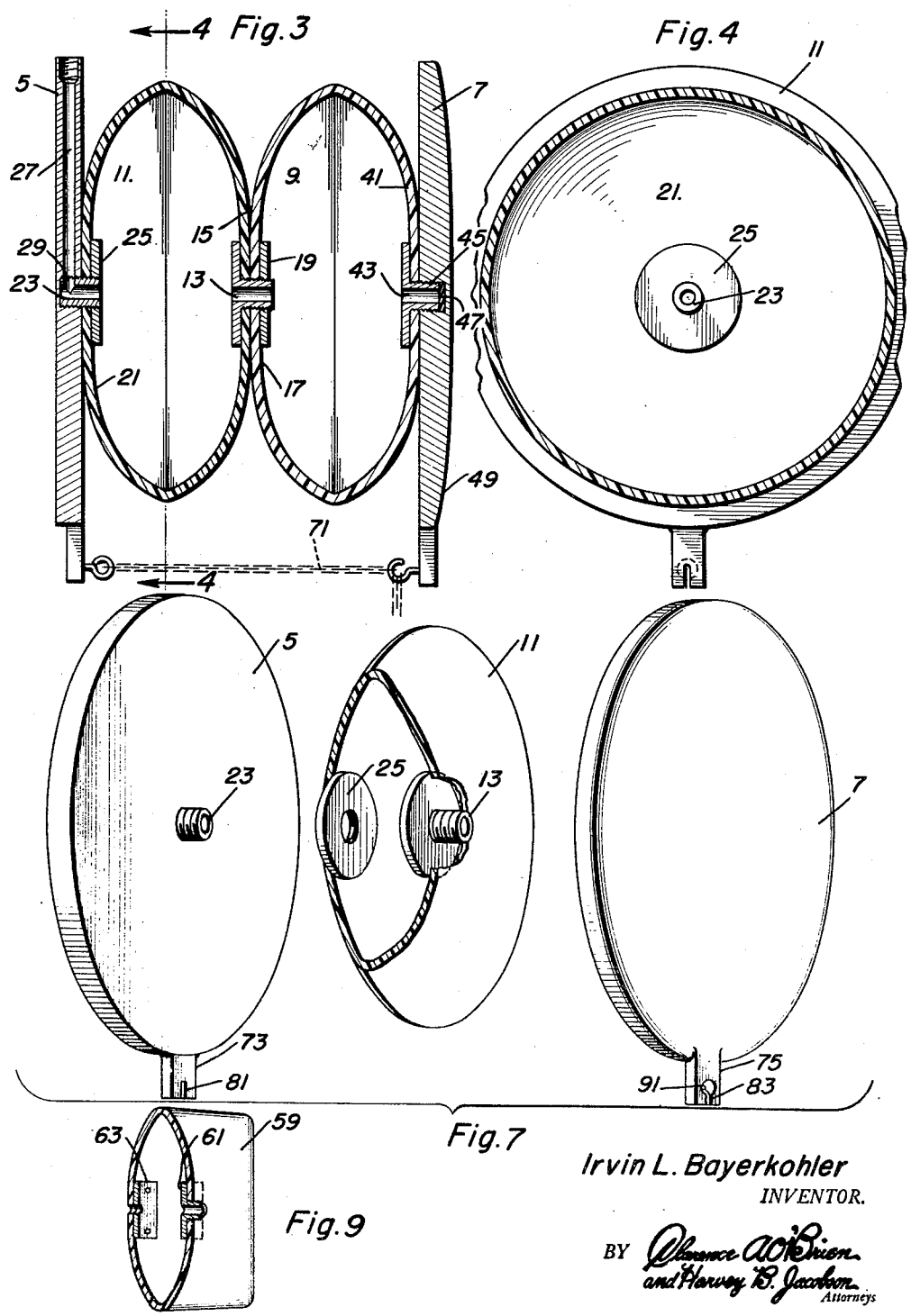

United States Patent Office 2,804,118
Patented Aug. 27, 1957

2,804,118

PNEUMATIC BELLOWS TYPE JACKS

Irvin L. Bayerkohler, Boyd, Minn.

Application September 13, 1954, Serial No. 455,728

1 Claim. (Cl. 153—32)

My invention relates to improvements in pneumatic jacks for straightening automobile body parts especially, although not necessarily.

The primary object of my invention is to provide a pneumatic jack of the bellows type adapted for use in straightening automobile bodies and fenders where, because of space limitations, it is impossible to use other types of jacks.

Another object is to provide a bellows type jack adapted for applying pressure to automobile body parts by means of a dolly plate, and for ready quick attachment to the jack of dolly plates of different sizes and contours as required by the contour of the part to be straightened.

Other and subordinate objects, together with the precise nature of my improvements, will become apparent when the following description and claims are read with reference to the accompanying drawings in which:

Figure 1 is a view in side elevation, partly in section, illustrating the manner in which my improved jack, in the preferred embodiment thereof, may be collapsed and positioned in a restricted space between two walls of an automobile body for operation to straighten a bend in one of the walls;

Figure 2 is a similar view illustrating how the jack is extended to straighten the bend;

Figure 3 is a view in longitudinal section of the jack extended;

Figure 4 is a view in transverse section taken on the line 4—4 of Figure 3;

Figure 5 is an enlarged view partly in side elevation and partly in longitudinal section of an air hose fitting forming part of the jack;

Figure 6 is a view in side elevation drawn to a smaller scale of a first modified embodiment of my improved jack;

Figure 7 is an exploded view in perspective of parts of the first modified embodiment drawn to a larger scale with one part broken away and shown in section;

Figure 8 is a view in side elevation of a second modified embodiment of the jack drawn to a smaller scale, and Figure 9 is a fragmentary view in perspective drawn to a smaller scale of a third modified embodiment of the jack.

Referring by numerals to the drawings, and first to Figures 1 to 5, according to my invention, in the preferred embodiment thereof, a jack 1 is provided comprising a bellows 3 interposed between a rear base plate 5 and a front presser or dolly plate 7, the bellows 3 and plates 5, 7 being coaxially arranged.

The bellows 3 comprises a pair of front and rear coaxial, expansible and contractile, air pressure chamber sections 9, 11 of suitable resilient material such as vulcanized rubber composition, and said bellows is preferably annular in cross-section. The chamber sections 9, 11 are detachably attached together in the axis thereof by a circumferentially flanged and threaded nipple 13 extended forwardly through a front wall 15 of the rear chamber section 11 through a rear wall 17 of the front chamber section 9 and having a washer 19 threaded thereon and coacting with the flanged nipple to clamp said walls 15, 17 together with the nipple 13 establishing communication between said sections 9, 11.

The base plate 5 which is preferably circular is detachably attached to a rear wall 21 of the rear chamber section 11 by an axial threaded air inlet nipple 23 threaded into said plate 5 and extended through said rear wall 21 with a washer 25 threaded thereon and clamping said wall 21 to said plate 5. A radial air passage 27 in the base plate 5 in communication with a radial air inlet port 29 in the nipple 23 provides for admitting air under pressure through said plate 5 into the rear chamber section 11 through nipple 23 to pass into the front chamber section 9 through the nipple 13 to inflate and expand the bellows.

An air hose fitting 31 is threaded into an enlarged outer end 33 of the passage 27 and to which is clamped, as at 35, an air hose 37 with a terminal tire valve 39 for connection to a suitable source of air under pressure, not shown, for inflating the chamber sections 9, 11. As will be obvious, the air valve 39 may be opened in the usual manner to deflate said sections 9, 11 so that the bellows can be contracted for collapsing the same for instance by pressing either plate, 5, 7, toward the other.

The presser or dolly plate 7 is detachably attached to a front wall 41 of the front chamber section 9 by an axial nipple 43 corresponding to the nipple 31 for a purpose presently clear and which is threaded into a rear socket 45 in said plate 7 against a gasket 47 in said socket. The presser or dolly plate 7 is preferably circular and may have a contoured front face 49 suitable for pressing a correspondingly contoured body part into shape. Both of the plates 5, 7 are preferably wider than the bellows 3.

It is to be noted that the washers 19, 25 are suitably fixed to the walls 17, 21 and the nipples 13, 43 are suitably fixed to the walls 15, 41. By this arrangement, the presser or dolly plate 7 can be detached for replacement by a differently contoured one, as may be required, and the front chamber section 9 may be detached from the rear chamber section 11 and the presser or dolly plate 7 attached to nipple 13, whereby to form the first modified embodiment of the invention shown in Figure 6 and which comprises a single chamber bellows 51. Also, the rear chamber section 11 may be detached from base plate 5 and sections 53, 55 like the section 9 added at the rear of the section 11 with said plate 5 attached to the last added section 55 to form the second modified embodiment of the invention illustrated in Figure 8 in which the bellows 57 comprises four chamber sections.

As shown in the modified embodiment of Figure 9, the chamber sections of the described bellows may be rectangular in edge outline, as exemplified by the chamber 59 shown, and the nipples 61 may be square flanged, and the washers, as at 63, square.

In using the described jack, the jack 1 is collapsed into flat thin form as shown in Figure 1. The jack may then be interposed in a very restricted space between an abutment and a body, or door, wall part or a fender part of an automobile for instance between two walls parts 65, 67 of an automobile door with the presser or dolly plate 7 confronting a bend 69 in one of the wall parts so that when the bellows 3 is expanded, the presser or dolly plate 7 will be engaged with the bend 69 to straighten out the same by pressure thereagainst.

As shown in the preferred embodiment Figures 1 to 5 to prevent the presser or dolly plate 7 from tilting in straightening a bend such as 69 by following the path of least resistance when the metal in the bend is softer, or thinner in one place than in others, a cross-chain 71 is attached to radial opposite edge lugs 73, 75 on the base plate 5 and the presser or dolly plate 7 by an eye bolt 77 and a hook 79 to be tightened when the bellows 3 is expanded and limit jacking movement of the presser or dolly plate 7 at one side thereof at the softer part of the bend when the jack is turned to position said side opposite said softer part. Thus the jack may be used to exert greater pressure at the harder portion of the bend 69. The eye bolt 77 and hook 79 are frictionally held in slots 81, 83 in the lugs 73, 75 and by flared heads 85, 87 thereon seating in correspondingly shaped sockets 89, 91 at the inner ends of the slots 81, 83 so that said bolt 77 and hook 79 may be removed to remove the chain 71 when use of said chain is not desired. The effective length of the chain 71 may be varied by attaching different links thereof to hook 79.

The foregoing will, it is believed, suffice to impart a clear understanding of my invention, without further explanation.

Manifestly, the invention is susceptible of modification, without departing from the inventive concept, and right is herein reserved to such modifications as fall within the scope of the appended claim.

What is claimed as new is as follows:

A pneumatic jack adapted to be interposed between an abutment and a bent part of an automobile body or fender comprising a base plate adapted to rest against an abutment, a presser plate adapted to be opposed against a bent part, a bellows interposed between said plate for expansion to press said presser plate against the bent part, means to introduce air under pressure through said base plate into said bellows to expand the same, and flexible means cross connecting said plates at opposite points on the edges thereof to prevent the presser plate from tilting at its connected point away from the base plate under expansion of the bellows, said last mentioned means comprising a pair of radial opposite edge lugs on said plates, a chain connected to one lug, and a hook on the other lug to which the chain is detachably attached.

References Cited in the file of this patent
UNITED STATES PATENTS

| | | |
|---|---|---|
| 1,109,499 | Zierden | Sept. 1, 1914 |
| 1,163,385 | Waters | Dec. 7, 1915 |
| 1,745,959 | Steiner | Feb. 4, 1930 |
| 1,752,101 | Meutsch | Mar. 25, 1930 |
| 1,971,975 | Clark | Aug. 28, 1934 |
| 2,151,063 | Weaver | Mar. 21, 1939 |
| 2,442,939 | Schram | June 8, 1948 |

FOREIGN PATENTS

| | | |
|---|---|---|
| 250,160 | Italy | Sept. 16, 1926 |
| 807,389 | France | Oct. 12, 1936 |